United States Patent
Itou et al.

(10) Patent No.: US 6,901,638 B2
(45) Date of Patent: Jun. 7, 2005

(54) BURGLARPROOF RETAINER CLIP AND METHOD OF MANUFACTURING THE RETAINER CLIP

(75) Inventors: Yuichi Itou, Oita (JP); Kouki Gotou, Oita (JP)

(73) Assignee: Thuou Hatujyo Kougyou Kabusiki Kaisya, Oita (JP)

( * ) Notice: Subject to any disclaimer, the term of this patent is extended or adjusted under 35 U.S.C. 154(b) by 109 days.

(21) Appl. No.: 10/362,063

(22) PCT Filed: Sep. 7, 2001

(86) PCT No.: PCT/JP01/07827

§ 371 (c)(1), (2), (4) Date: Mar. 12, 2003

(87) PCT Pub. No.: WO02/22997

PCT Pub. Date: Mar. 21, 2002

(65) Prior Publication Data

US 2003/0177618 A1 Sep. 25, 2003

(30) Foreign Application Priority Data

Sep. 12, 2000 (JP) ........................................ 2000-275787

(51) Int. Cl.[7] ............................ A44B 21/00; E16B 2/24; E05B 9/08
(52) U.S. Cl. .............................. 24/570; 24/459; 24/536; 24/564; 24/571; 411/522; 411/524; 70/370; 403/254
(58) Field of Search .......................... 24/570, 564, 571, 24/545, 459, 536, 531, 532; 174/40 CC; 281/42; 40/603; 411/522, 523, 524; 70/370; 72/339; 403/155, 254

(56) References Cited

U.S. PATENT DOCUMENTS

| | | | | |
|---|---|---|---|---|
| 2,244,427 A | * | 6/1941 | Miller | 411/522 |
| 2,278,708 A | * | 4/1942 | Miller | 411/522 |
| 2,744,185 A | * | 5/1956 | Cawley | 70/370 |
| 2,950,514 A | * | 8/1960 | Small | 24/570 |
| 3,297,916 A | * | 1/1967 | Wright | 411/522 |
| 5,636,540 A | * | 6/1997 | Myers | 70/370 |
| 6,305,870 B1 | * | 10/2001 | Mita et al. | 411/522 |

FOREIGN PATENT DOCUMENTS

| | | |
|---|---|---|
| JP | 54-10497 | 1/1979 |
| JP | 57-196755 | 12/1982 |
| JP | 3-49011 | 10/1991 |
| JP | 4-37773 | 3/1992 |
| JP | 9-170360 | 6/1997 |
| JP | 11-172971 | 6/1999 |

* cited by examiner

*Primary Examiner*—Victor Sakran
(74) *Attorney, Agent, or Firm*—Jordan and Hamburg LLP

(57) ABSTRACT

An antitheft retainer clip according to this invention is a retainer clip 1, with which slits 3 are provided in inserted parts 2 so as to form press-contacting parts 4 and auxiliary parts 5, and comprises the press-contacting parts, which are formed to be substantially the same in width as upper parts of cylinder slits 9, raised parts 10, which are put in pressed contact against the upper parts of the cylinder slits, and inclining parts 11, which are provided continuous to the raised parts.

24 Claims, 9 Drawing Sheets

PRIOR ART
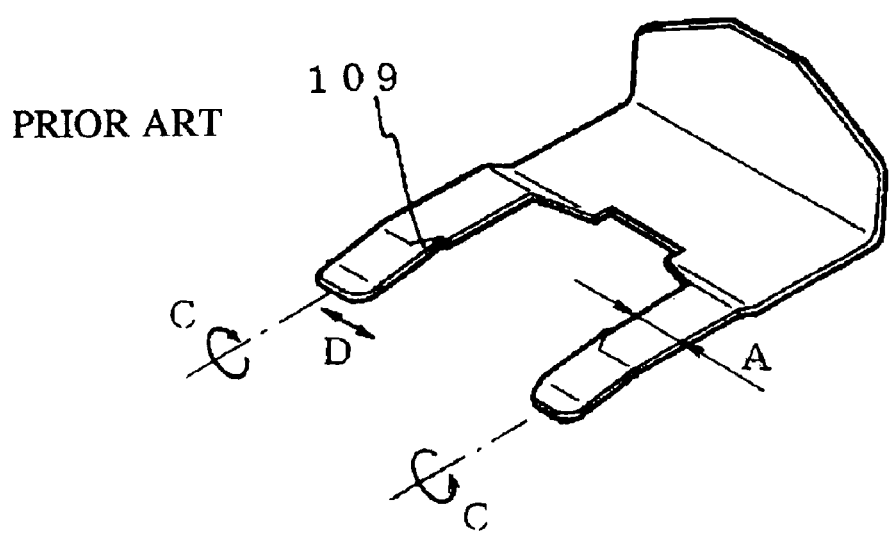
F I G. 2

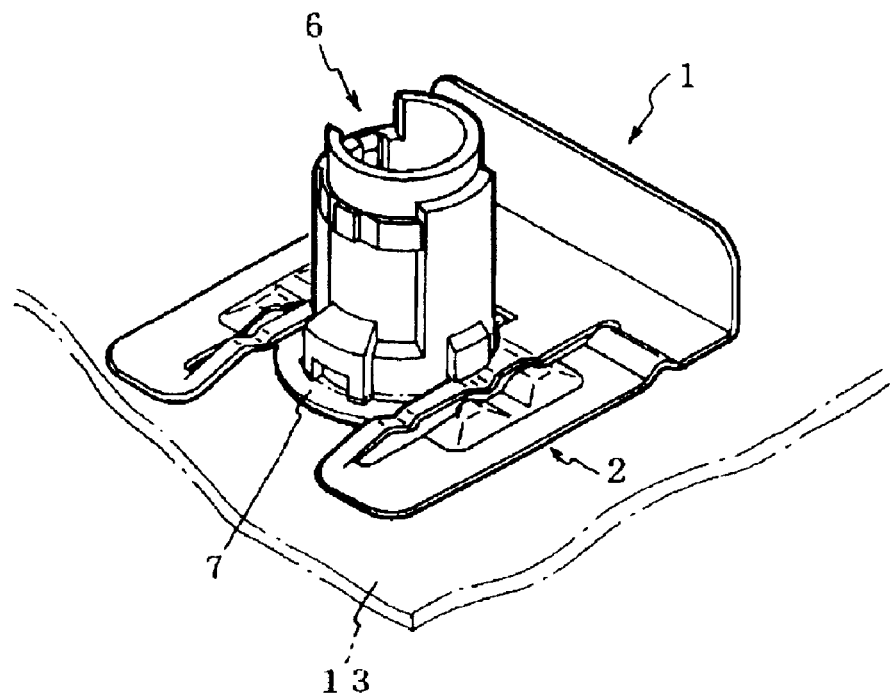
F I G. 5
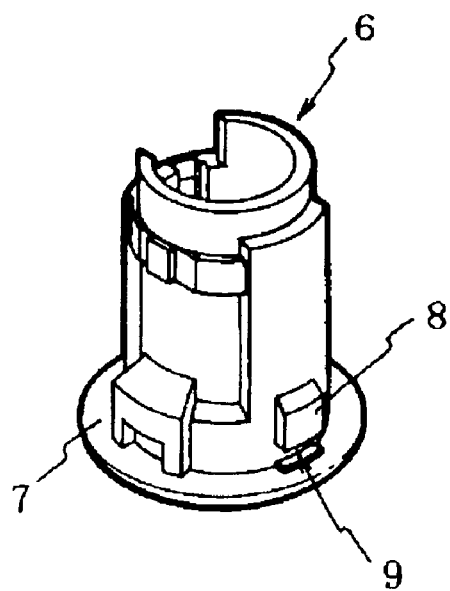
F I G. 6

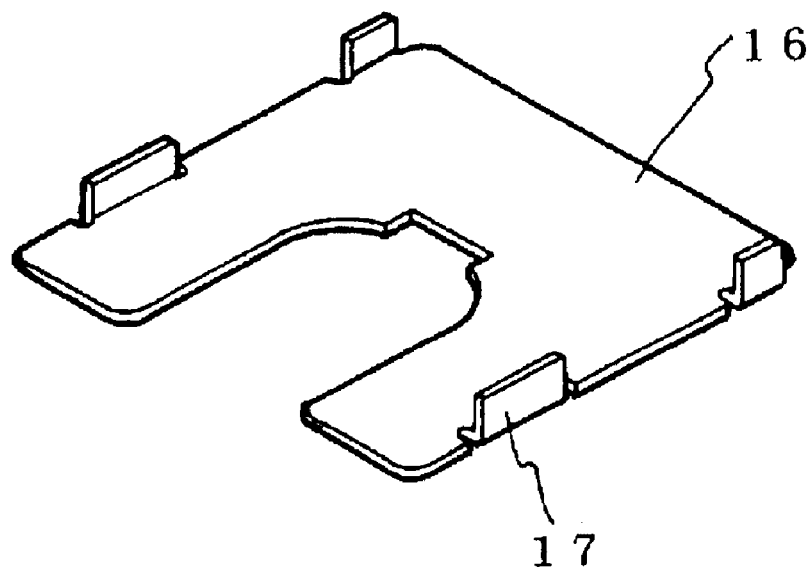
F I G. 1 1
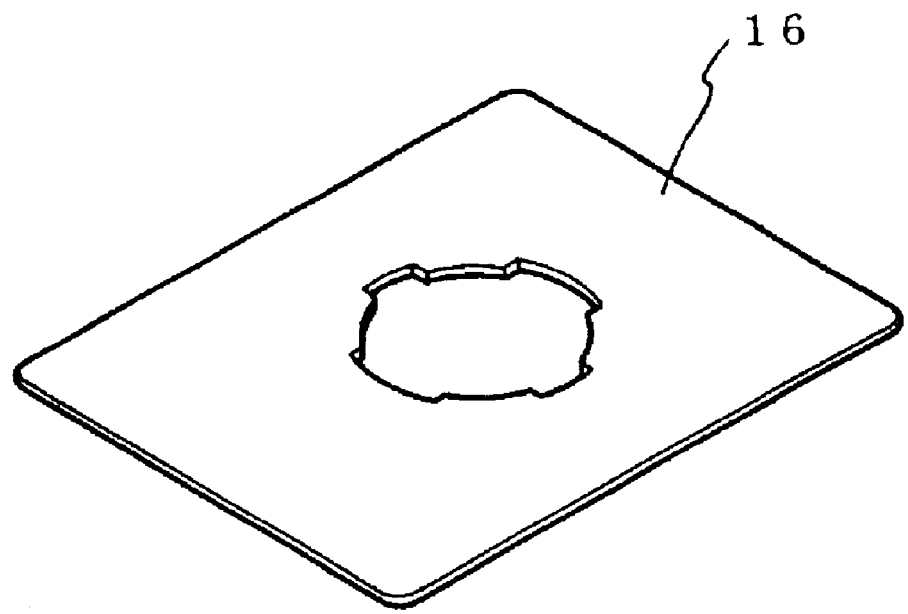
F I G. 1 2

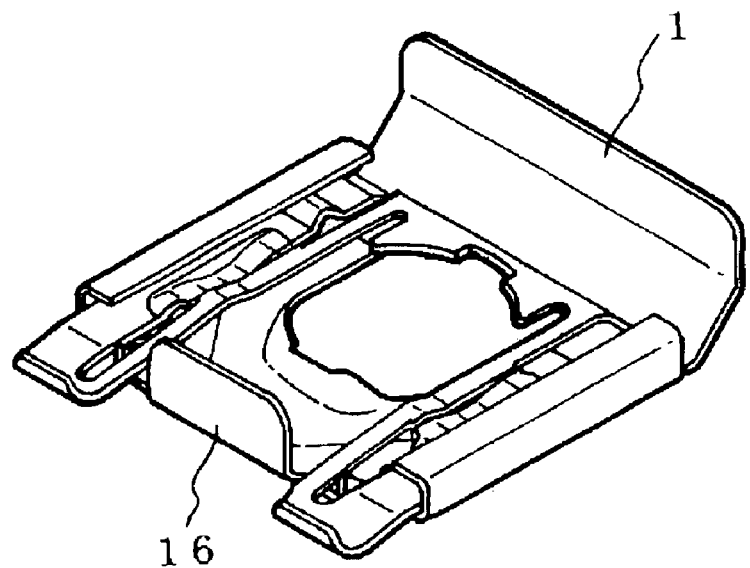
F I G . 1 5
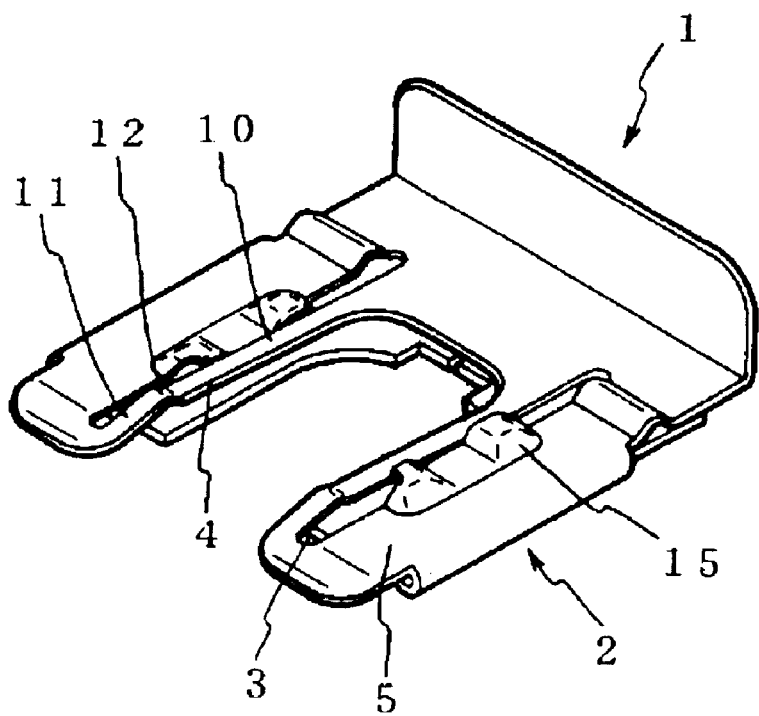
F I G . 1 6

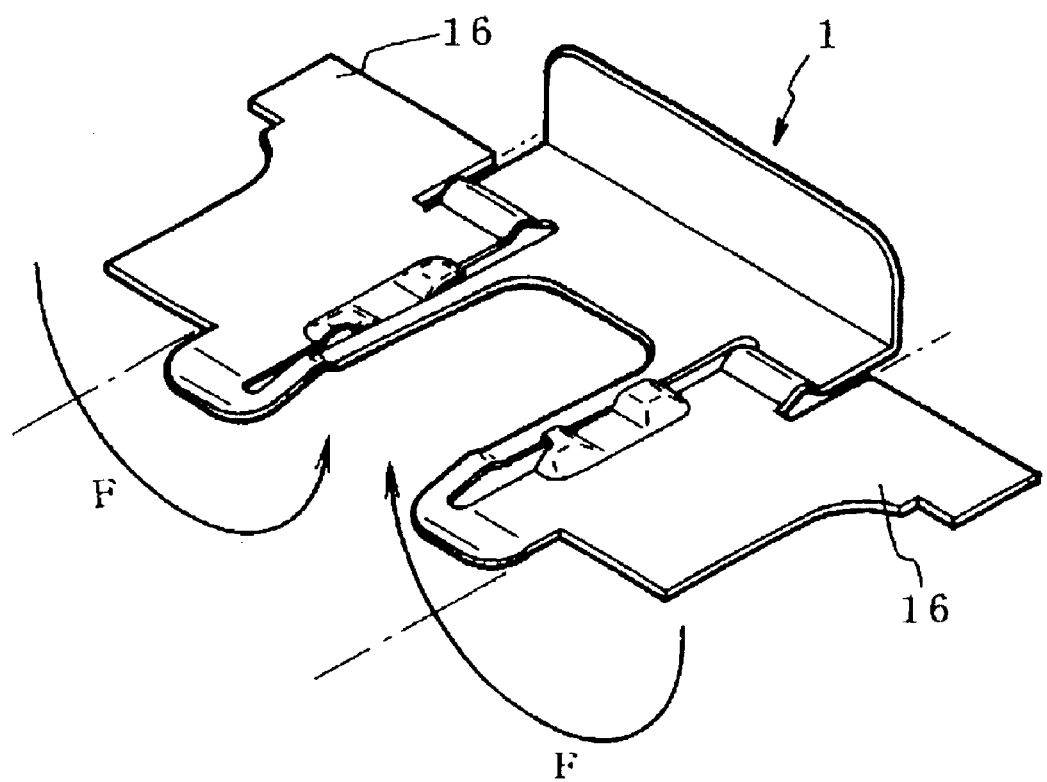
F I G. 1 7

US 6,901,638 B2

BURGLARPROOF RETAINER CLIP AND METHOD OF MANUFACTURING THE RETAINER CLIP

FIELD OF THE ART

This invention concerns an antitheft retainer clip and a method of manufacture thereof. To be more specific, this invention concerns an antitheft retainer clip, which has a press-contacting part, a raised part, and an inclining part for preventing twisting and turning and thereby preventing automobile theft, and a method of manufacture of such an antitheft retainer clip.

BACKGROUND ART

A prior-art retainer clip shall now be described by way of FIG. 1, FIG. 2, and FIG. 3.

FIG. 1 is a perspective view, showing the condition of attachment of a prior-art retainer clip, FIG. 2 is a perspective view, showing the prior-art retainer clip, and FIG. 3 is a perspective view, showing a prior-art key cylinder.

Inserted parts 106 of a retainer clip 105 with a substantially C-like planar shape are inserted into cylinder slits 104 provided in large and small anti-rotation protrusions 103 that are respectively formed in pairs on side end parts of a flange part 102 of a key cylinder 101, and the key cylinder was attached to an automotive body panel by the press-contacting of raised parts 107 formed on the inserted parts against cylinder slit upper parts 108. In FIG. 2, symbol 109 indicates a hook that is provided for preventing the falling-off of the attached retainer clip.

However, with the prior-art retainer clip, there was a problem in that since the width (symbol B in FIG. 3) of each of the anti-rotation protrusions formed on the side end parts of the flange part of the key cylinder is smaller than the width (symbol A in FIG. 2) of each of the inserted parts and only a part of each inserted part is thus press-contacted against the corresponding anti-rotation protrusion, when a deforming force is applied directly or indirectly to the key cylinder by a screwdriver or other illicit unlocking tool, the inserted parts became turned in the directions of symbols C in FIG. 2, causing the press-contacting of the inserted parts and anti-rotation protrusions to become disengaged, the retainer clip to fall off, and the key cylinder to become removed from the automotive body panel.

Though a means, wherein the inserted parts are made small in width so that the entire inserted parts are put in pressed contact against the anti-rotation protrusions, may be considered in regard to the above problem, with such a means, though the turning of the inserted parts can be prevented, the inserted parts can slide in transverse directions (directions indicated by symbol D in FIG. 2) to cause the retainer clip to fall off and the key cylinder to become removed from the automotive body panel.

Though a means, wherein the inserted parts are made thick in plate thickness, may be considered for the prevention of sliding, such a means is not necessarily feasible in consideration of the requirement that, in the process of attaching or removing a retainer clip, the work be done within a fixed range of force.

DISCLOSURE OF THE INVENTION

This invention has been made in view of the above points, and an object thereof is to provide an antitheft retainer clip, which is high in theft preventing ability and with which, even when a deforming force is applied directly or indirectly to a key cylinder by a screwdriver or other illicit unlocking tool, the turning of inserted parts is prevented and the sliding of the inserted parts is prevented as well to thereby prevent the key cylinder from becoming removed from the automotive body panel, and a method of manufacture of such an antitheft retainer clip.

In order to achieve the above object, this invention provides in an antitheft retainer clip, wherein a retainer clip with a substantially C-like planar shape has a pair of inserted parts and each inserted part is provided with a slit that forms a press-contacting part and an auxiliary part, an antitheft retainer clip comprising: press-contacting parts, each formed to be substantially the same in width as an upper part of a cylinder slit, provided in each of a pair of anti-rotation protrusions formed on side end parts of a flange part of a key cylinder; raised parts, each formed on each of the above mentioned press-contacting parts that are put in pressed contact against the abovementioned cylinder slit upper parts; and inclining parts, each provided continuous to each of the abovementioned raised parts.

Here, since the entirety of each press-contacting part, formed by the provision of a slit in the corresponding inserted part of the retainer clip, is put in pressed contact against the upper part of the cylinder slit, provided in the corresponding anti-rotation protrusion formed on a side end part of the flange part of the key cylinder, the turning of the press-contacting parts can be prevented and the theft preventing ability can thus be improved.

Also, since reinforcing parts, formed by the provision of slits in the inserted parts of the retainer clip, ensures rigidity after attachment of the retainer clip, the sliding of the press-contacting part in transverse directions can be prevented and the theft preventing ability can thus be improved.

This invention also provides in an antitheft retainer clip, wherein a retainer clip with a substantially C-like planar shape has a pair of inserted parts and each inserted part is provided with a press-contacting part that is put in pressed contact against an upper part of a cylinder slit, provided in each of a pair of anti-rotation protrusions formed on side end parts of a flange part of a key cylinder, an antitheft retainer clip comprising: press-contacting parts, formed to be substantially the same in width as the abovementioned cylinder slit upper parts; raised parts, each formed on each of the abovementioned press-contacting parts that are put in pressed contact against the abovementioned cylinder slit upper parts; and inclining parts, each provided continuous to each of the abovementioned raised parts.

Here, since the entirety of each press-contacting part, formed on an inserted part of the retainer clip, is put in pressed contact against the upper part of the cylinder slit, provided in the corresponding anti-rotation protrusion formed on a side end part of the flange part of the key cylinder, the turning of the press-contacting part can be prevented and the theft preventing ability can thus be improved.

Also in order to achieve the above object, this invention provides in a method of manufacturing an antitheft retainer clip, wherein a retainer clip with a substantially C-like planar shape has a pair of inserted parts and each inserted part is provided with a slit that forms a press-contacting part and an auxiliary part, an antitheft retainer clip manufacturing method comprising the steps of: forming each of the abovementioned press-contacting parts to be substantially the same in width as an upper part of a cylinder slit, provided in each of a pair of anti-rotation protrusions formed on side end parts of a flange part of a key cylinder; forming a raised part on each of the abovementioned press-contacting parts that are put in pressed contact against the abovementioned cylinder slit upper parts; and forming an inclining part continuous to each of the abovementioned raised parts.

Here, by forming press-contacting parts, which are formed by the provision of slits in the respective inserted parts of the retainer clip, to be substantially the same in width as the upper parts of cylinder slits, provided in the pair of anti-rotation protrusions formed on side end parts of the flange part of the key cylinder, the turning of the press-contacting part can be prevented and the theft preventing ability can thus be improved.

Also, since the rigidity after attachment of the retainer clip is secured by the forming of auxiliary parts by the provision of slits in the respective inserted parts of the retainer clip, the sliding of the press-contacting parts in transverse directions can be prevented and the theft preventing ability can thus be improved.

This invention also provides in a method of manufacturing an antitheft retainer clip, wherein a retainer clip with a substantially C-like planar shape has a pair of inserted parts and each inserted part is provided with a press-contacting part that is put in pressed contact against an upper part of a cylinder slit, provided in each of a pair of anti-rotation protrusions formed on side end parts of a flange part of a key cylinder, an antitheft retainer clip manufacturing method comprising the steps of: forming each of the abovementioned press-contacting parts to be substantially the same in width as the upper part of each cylinder slit; forming a raised part on each of the abovementioned press-contacting parts that are put in pressed contact against the abovementioned cylinder slit upper parts; and forming an inclining part continuous to each of the abovementioned raised parts.

Here, by forming the press-contacting parts, which are formed on inserted parts of the retainer clip, to be substantially the same in width as the upper parts of the cylinder slits, provided at the pair of anti-rotation protrusions formed on side end parts of the flange part of the key cylinder, the turning of the press-contacting part can be prevented and the theft preventing ability can thus be improved.

BRIEF DESCRIPTION OF THE DRAWINGS

FIG. 2 is a perspective view, showing the prior-art retainer clip.

FIG. 5 is a perspective view, showing the condition of attachment of the antitheft retainer clip shown in FIG. 4.

FIG. 6 is a perspective view, showing a key cylinder.

FIG. 11 is a perspective view, showing the reinforcing plate of the yet another example of an antitheft retainer clip to which this invention is applied.

FIG. 12 is a perspective view, showing a modification example (1) of the reinforcing plate of the yet another example of an antitheft retainer clip to which this invention is applied.

FIG. 15 is a perspective view, showing the condition of attachment of the reinforcing plate modification example (3) shown in FIG. 14.

FIG. 16 is a perspective view for explaining even yet another example of an antitheft retainer clip to which this invention is applied.

FIG. 17 is a developed perspective view of the antitheft retainer clip shown in FIG. 16.

BEST MODE(S) FOR CARRYING OUT THE INVENTION

In order to further the understanding of this invention, embodiments of this invention shall now be described with reference to the drawings.

Figure 1:
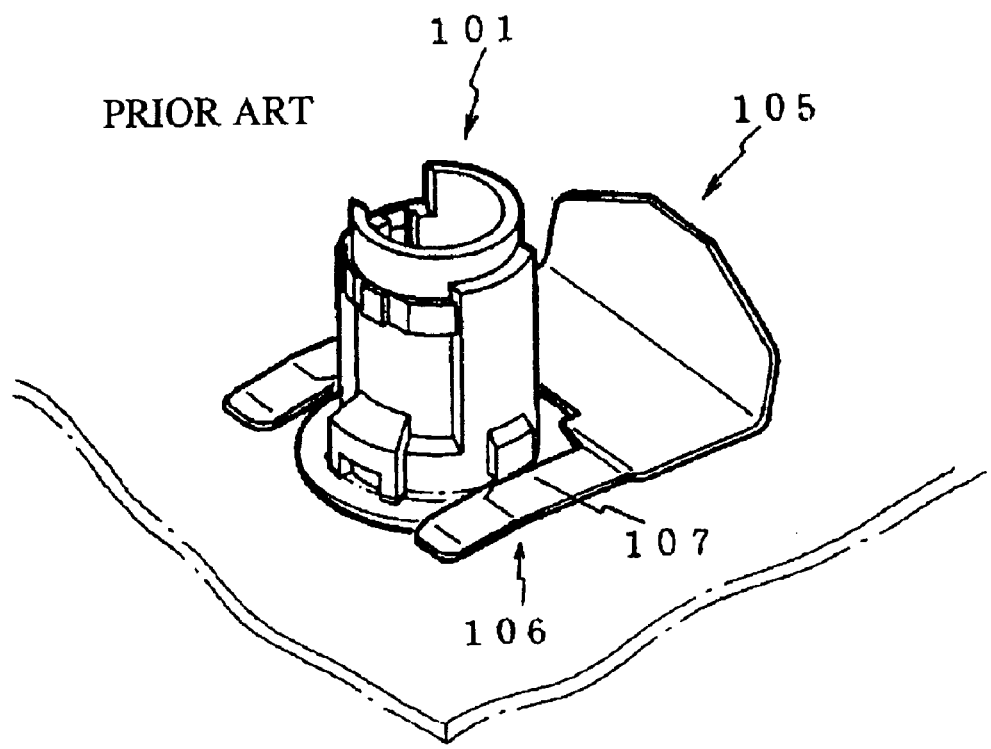
FIG. 1 is a perspective view, showing the condition of attachment of a prior-art retainer clip.
Figure 3:
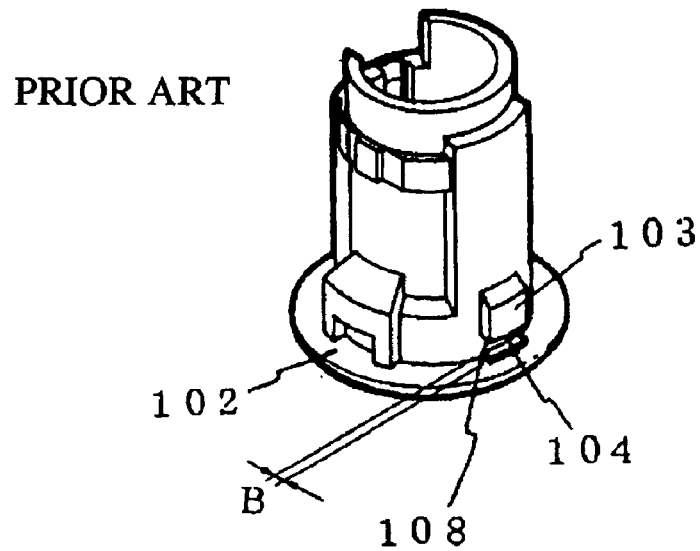
FIG. 3 is a perspective view, showing a prior-art key cylinder.
Figure 4:
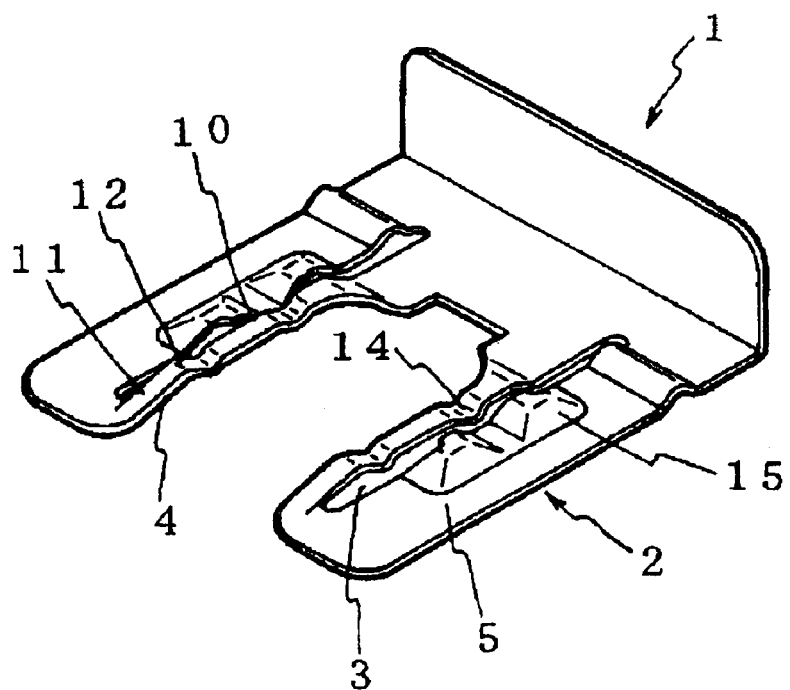
FIG. 4 is a perspective view for explaining an example of an antitheft retainer clip to which this invention is applied.

FIG. 4 is a perspective view for explaining an example of an antitheft retainer clip to which this invention is applied. A retainer clip 1, shown here, is a retainer clip with a substantially C-like planar shape that is equipped with a pair of inserted parts 2, and each inserted part is provided with a slit 3 that forms a press-contacting part 4 and an auxiliary part 5.

Here, each press-contacting part is formed to be substantially the same in width as an upper part of a cylinder slit 9, provided at each of a pair of anti-rotation protrusions 8 formed on side end parts of a flange part 7 of a key cylinder 6.

Also, on each press-contacting part are formed a raised part 10, which is put in pressed contact against the upper part of the cylinder slit, an inclining part 11, which is continuous to the raised part and is inclined slantingly downwards, and a protruding part 12, which engages with a protrusion of the key cylinder.

Also on each raised part is formed a protrusion-like part 14 that protrudes towards an automotive body panel 13.

Also on each auxiliary part is formed an auxiliary recessed part 15 that is recessed with respect to the automotive body panel.

The press-contacting part and the auxiliary part are formed to be connected at a front end part and a base end part of the inserted part.

Here, it is sufficient that each press-contacting part and auxiliary part be formed by the provision of a slit in each inserted part, and this slit therefore is not restricted to being formed as a cut but may instead be a punched shape, etc. of narrow width.

Also, it is sufficient that the press-contacting of each press-contacting part against the upper part of the cylinder slit improves the theft preventing ability by preventing the turning of the press-contacting part and that the auxiliary parts improve the theft preventing ability by preventing the sliding of the press-contacting parts in transverse directions. Though the press-contacting parts and the auxiliary parts therefore do not necessarily have to be formed to be connected at the front end parts and base end parts of the inserted parts, it is preferable for the press-contacting parts and the auxiliary parts to be formed to be connected at the front end parts and base end parts of the inserted parts so as to enable the auxiliary parts to prevent the sliding of the press-contacting parts in transverse directions more efficiently.

Furthermore, though the auxiliary recessed parts do not have to be formed necessarily as long as the sliding of the press-contacting parts in transverse directions can be prevented by the auxiliary parts, the auxiliary recessed parts are preferably formed so as to be recessed with respect to the automotive body panel in order to enable the auxiliary parts to prevent the sliding of the press-contacting parts in transverse directions more efficiently.

Also, though the auxiliary recessed parts maybe recessed parts of fixed depth, in order to enable adequate prevention of the sliding of the press-contacting parts in transverse directions, even in a case where the press-contacting parts are changed in position by a spring action, the recessed parts are preferably formed so as not to be of fixed depth, that is for example, the recessed parts are preferably formed to be small in the proportion of their central parts, etc.

Also, though the protruding parts do not have to be formed necessarily, protruding parts that engage with protrusions on the key cylinder are preferably formed on the press-contacting parts so that by the engagement of the protrusions of the key cylinder with the protruding parts, the falling-off of the retainer clip can be prevented more effectively and the theft preventing ability can be improved further.

Likewise, though the protrusion-like parts also do not have to be formed necessarily, protrusion-like parts, which protrude towards the automotive body panel, are preferably formed on the raised parts so as to enable gaps between the raised parts and the automotive body panel to be reduced thereby minimize movement of the retainer clip in the axial direction of the key cylinder in a case where a deforming force is applied directly or indirectly by an illicit unlocking tool.

With the antitheft retainer clip to which this invention is applied, the entirety of each press-contacting part is put in pressed contact against the upper part of the cylinder slit to enable turning of the corresponding inserted part to be prevented even when a deforming force is applied directly or indirectly to the key cylinder by a screwdriver or other illicit unlocking tool, and the sliding of the press-contacting parts in transverse directions is prevented by the auxiliary parts.

Figure 7:
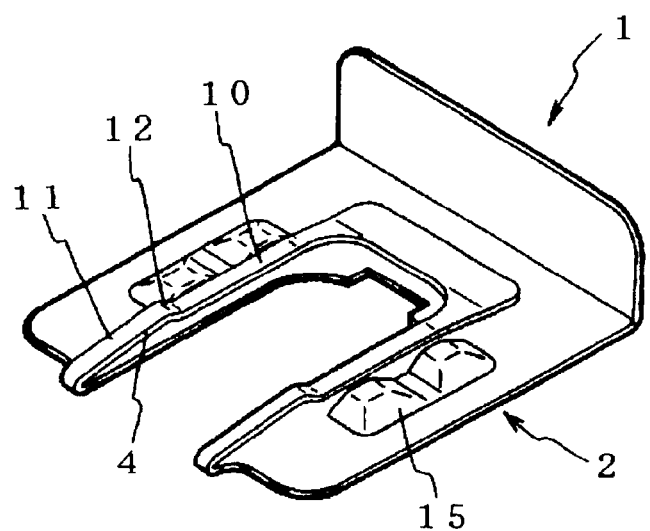
FIG. 7 is a perspective view for explaining another example of an antitheft retainer clip to which this invention is applied.

FIG. 7 is a perspective view for explaining another example of an antitheft retainer clip to which this invention is applied. The retainer clip 1 shown here is formed, from the developed condition shown in FIG. 8, by folding press-contacting parts in direction indicated by symbol E in FIG. 8.

Retainer clip 1 is a retainer clip with a substantially C-like planar shape having a pair of inserted parts 2, and on each inserted part is formed a press-contacting part 4, which is put in pressed contact against an upper part of a cylinder slit, provided in each of a pair of anti-rotation protrusions formed on side end parts of a flange part of a key cylinder.

Here, each press-contacting part is formed to be substantially the same in width as the upper part of the cylinder slit and has formed thereon a raised part 10, which is put in pressed contact against the upper part of the cylinder slit, an inclining part 11, which is continuous to the raised part and is inclined slantingly downwards, and a protruding part 12, which engages with a protrusion of the key cylinder.

Also, on each inserted part of the retainer clip, an auxiliary recessed part 15 is formed so as to be recessed with respect to the automotive body panel at the outer side of the corresponding press-contacting part formed on the retainer clip.

Figure 8:
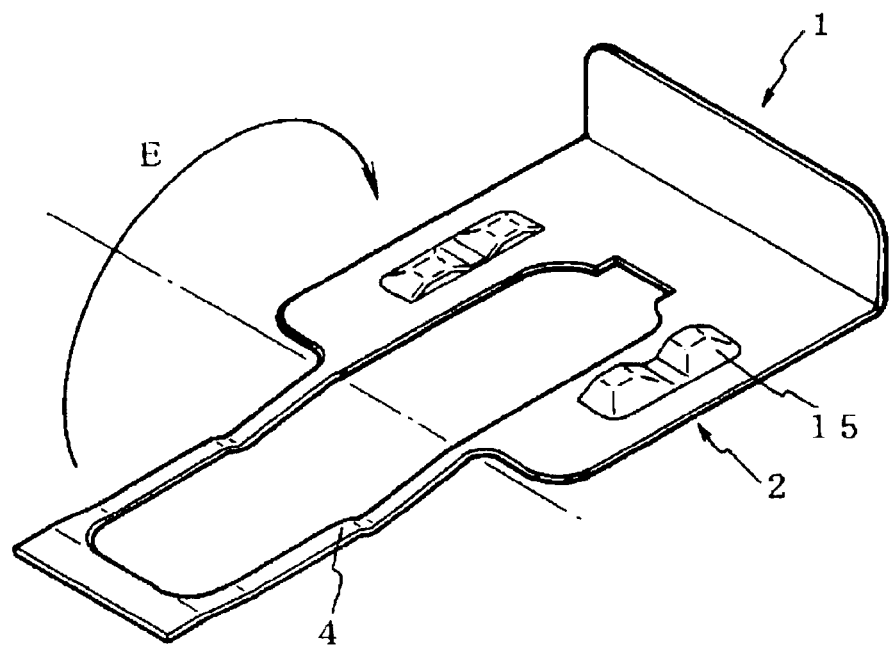
FIG. 8 is a developed perspective view of the antitheft retainer clip shown in FIG. 7.

Here, it is sufficient that each press-contacting part be formed to be substantially the same in width as the upper part of the cylinder slit, and obviously, the press-contacting parts do not have to be formed necessarily by folding the press-contacting parts in the direction indicated by symbol E in FIG. 8.

Also, though the auxiliary recessed parts do not have to be formed necessarily as long as the sliding of the press-contacting parts in transverse directions can be prevented by the joining of the front end parts of the press-contacting parts with the inserted parts, auxiliary recessed parts are preferably formed at the inserted parts of the retainer clip so as to be recessed with respect to the automotive body panel and at the outer sides of the press-contacting parts formed on the retainer clip in order to enable more efficient prevention of the sliding of the press-contacting parts in transverse directions. Also, though the auxiliary recessed parts may be recessed parts of fixed depth, in order to enable adequate prevention of the sliding of the press-contacting parts in transverse directions, even in a case where the press-contacting parts are changed in position by a spring action, the recessed parts are preferably formed so as not to be of fixed depth, that is, for example, the recessed parts are preferably made small in the proportions of their central parts, etc. as in the above-described example of an antitheft retainer clip to which this invention is applied.

Furthermore as in the above-described example of an antitheft retainer clip to which this invention is applied, though the protruding parts do not have to be formed necessarily, protruding parts that engage with protrusions on the key cylinder are preferably formed on the press-contacting parts so that by the engagement of the protrusions of the key cylinder with the protruding parts, the falling-off of the retainer clip can be prevented more effectively and the theft preventing ability can be improved further.

With the antitheft retainer clip to which this invention is applied, the entirety of each press-contacting part is put in pressed contact against the upper part of the cylinder slit to enable the turning of the inserted parts to be prevented even when a deforming force is applied directly or indirectly to the key cylinder by a screwdriver or other illicit unlocking tool, and the sliding of the press-contacting parts in transverse directions is prevented.

Figure 9:
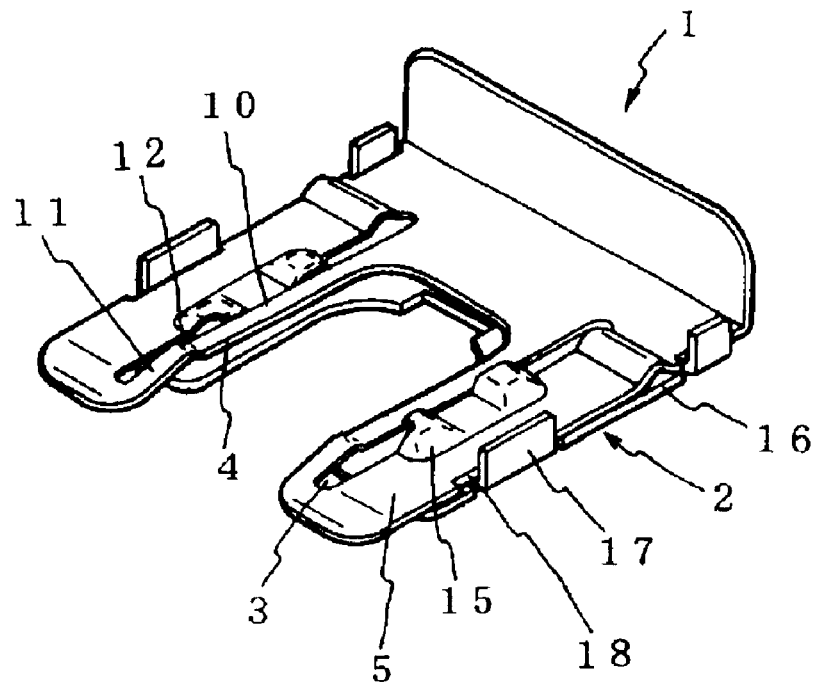
FIG. 9 is a perspective view for explaining yet another example of an antitheft retainer clip to which this invention is applied.
Figure 10:
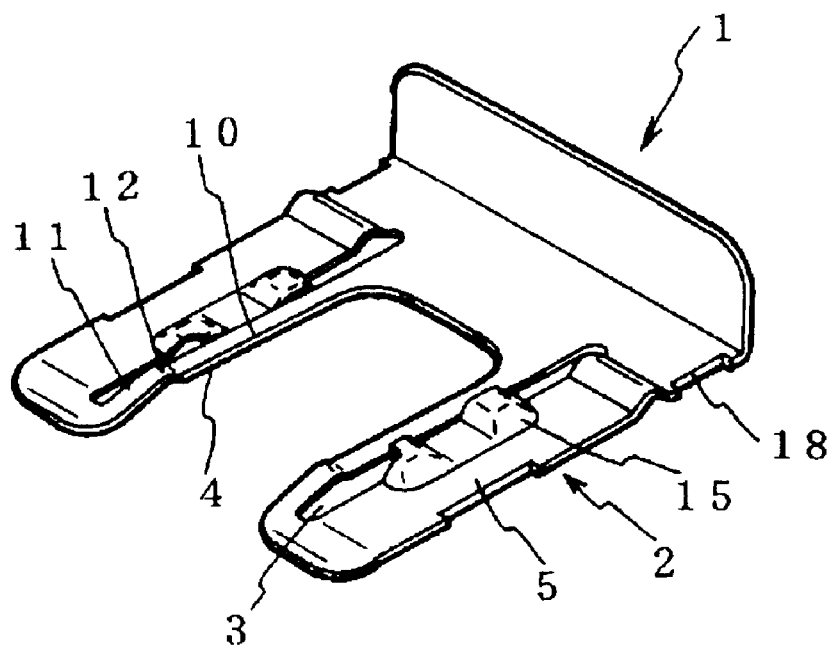
FIG. 10 is a perspective view, showing the main body of the retainer clip of the yet another example of an antitheft retainer clip to which this invention is applied.

FIG. 9 is a perspective view for explaining yet another example of an antitheft retainer clip to which this invention is applied. Here, a reinforcing plate 16 is formed at the automotive body panel side of inserted parts of a retainer clip, has a substantially C-like planar shape similar to the retainer clip, and has engaging parts 17 formed at four locations on the sides.

It is sufficient that the reinforcing plate reduce gaps between the automotive body panel and the retainer clip, and the reinforcing plate therefore does not have to have a substantially C-like planar shape as shown in FIG. 11 but may have a shape such as shown in FIG. 12 instead.

Here, the retainer clip and reinforcing plate are engaged and made integral for convenience of handling, and these two components obviously do not have to be made integral necessarily. That is, the reinforcing plate may be attached to the cylinder slits and then the retainer clip may be attached to the cylinder slits.

Figure 13:
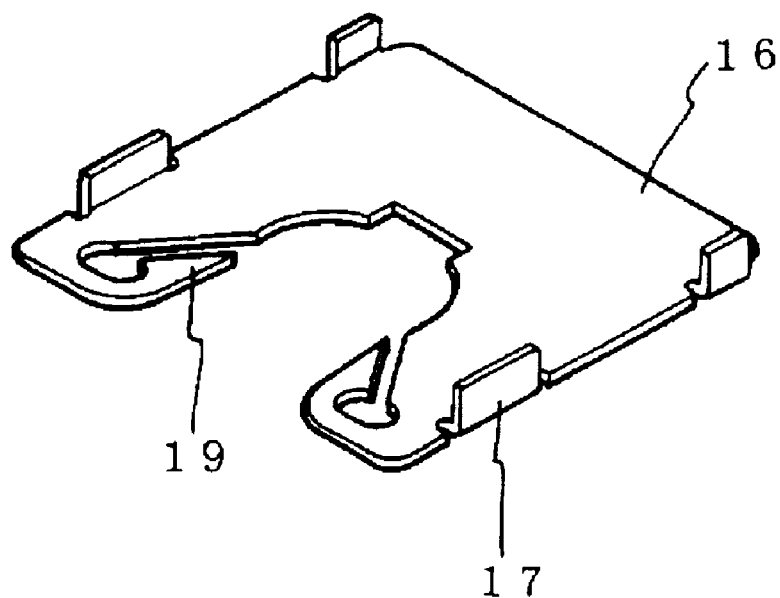
FIG. 13 is a perspective view, showing a modification example (2) of the reinforcing plate of the yet another example of an antitheft retainer clip to which this invention is applied.

The reinforcing plate is preferably formed as shown in FIG. 13. That is, the reinforcing plate is preferably formed with engaging parts 19 so that the falling-off of the retainer clip can be prevented not only by the engagement of the protruding parts 12 of the retainer clip with the key cylinder but also by the engagement of the engaging parts 19 of the reinforcing plate as well.

Figure 14:
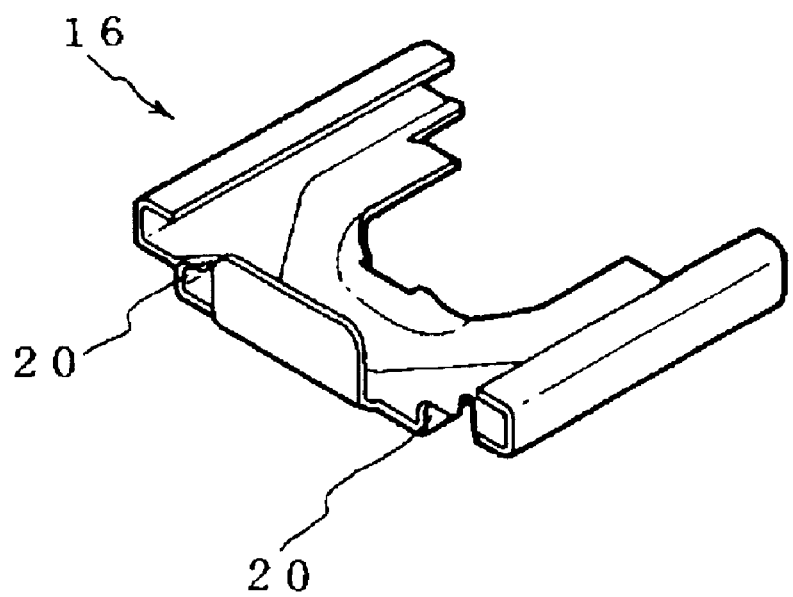
FIG. 14 is a perspective view, showing a modification example (3) of the reinforcing plate of the yet another example of an antitheft retainer clip to which this invention is applied.

The reinforcing plate may also have the shape shown in FIG. 14. That is, the reinforcing plate may be of a shape with which the retainer clip and the reinforcing plate clamp and become attached to a cylinder retainer from both sides. Hooks 20, which are formed on the reinforcing plate, fit into slits provided in the retainer clip and enable further prevention of the falling-off of the retainer clip.

With an antitheft retainer clip to which this invention is applied, since inclining parts and raised parts are formed on press-contacting parts due to the disposing of a reinforcing plate between an automotive body panel and a retainer clip, and since auxiliary recessed parts are formed on auxiliary parts, gaps between the automotive body panel and the retainer clip can be reduced and movement in the axial direction of the key cylinder in a case where a deforming force is applied directly or indirectly by an illicit unlocking tool can be minimized thereby realize further prevention of theft.

The theft preventing ability is furthermore improved by further prevention of the turning of the retainer clip by a screwdriver or other illicit unlocking tool by the forming of a reinforcing plate.

FIG. 16 is a perspective view for explaining even yet another example of an antitheft retainer clip to which this invention is applied. The reinforcing plate shown here is formed integral to inserted parts of a retainer clip, and is formed, from the developed condition shown in FIG. 17, by folding the reinforcing plate in the direction indicated by the symbol F in FIG. 17.

With this antitheft retainer clip to which this invention is applied, the retainer clip and the reinforcing plate can be formed integrally and the efficiency of production of the retainer clip can be improved.

INDUSTRIAL APPLICABILITY

As has been described above, with an antitheft retainer clip and a method of manufacture according to this invention, even when a deforming force is applied directly or indirectly to a key cylinder by a screwdriver or other illicit unlocking tool, the turning of inserted parts is prevented and the sliding of the inserted parts is prevented as well, thereby preventing the falling-off of the key cylinder or removal of the key cylinder from the automotive body panel and thus preventing the theft of an automobile.

What is claimed is:

1. An antitheft retainer clip, wherein a retainer clip with a substantially C-like planar shape has a pair of inserted parts and each inserted part is provided with a slit that forms a press-contacting part and an auxiliary part, said antitheft retainer clip comprising:

press-contacting parts, each formed to be substantially the same in width as an upper part of a cylinder slit, provided in each of a pair of anti-rotation protrusions formed on side end parts of a flange part of a key cylinder; raised parts, each formed on each of said press-contacting parts that are put in pressed contact against said cylinder slit upper parts; and inclining parts, each provided continuous to each of said raised parts;

wherein auxiliary recessed parts, which are recessed with respect to an automotive body panel, are formed on said auxiliary parts.

2. The antitheft retainer clip as set forth in claim 1, wherein a reinforcing plate is formed at the automotive body panel side of the inserted parts of the retainer clip.

3. An antitheft retainer clip, wherein a retainer clip with a substantially C-like planar shape has a pair of inserted parts and each inserted part is provided with a slit that forms a press-contacting part and an auxiliary part, said antitheft retainer clip comprising:

press-contacting parts, each formed to be substantially the same in width as an upper part of a cylinder slit, provided in each of a pair of anti-rotation protrusions formed on side end parts of a flange part of a key cylinder;

raised parts, each formed on each of said press-contacting parts that are put in pressed contact against said cylinder slit upper parts; and inclining parts, each provided continuous to each of said raised parts;

wherein a reinforcing plate is formed at an automotive body panel side of the inserted parts of the retainer clip.

4. An antitheft retainer clip, wherein a retainer clip with a substantially C-like planar shape has a pair of inserted parts and each inserted part is provided with a slit that forms a press-contacting part and an auxiliary part said antitheft retainer clip comprising:

press-contacting parts, each formed to be substantially the same in width as an upper part of a cylinder slit, provided in each of a pair of anti-rotation protrusions formed on side end parts of a flange part of a key cylinder;

raised parts, each formed on each of said press-contacting parts that are put in pressed contact against said cylinder slit upper parts; and inclining parts, each provided continuous to each of said raised parts;

wherein protrusion-like parts, which protrude towards an automotive body panel, are formed on said raised parts; and wherein auxiliary recessed parts, which are recessed with respect to the automotive body panel, are formed on said auxiliary parts.

5. The antitheft retainer clip as set forth in claim 4, wherein a reinforcing plate is formed at the automotive body panel side of the inserted parts of the retainer clip.

6. An antitheft retainer clip, wherein a retainer clip with a substantially C-like planar shape has a pair of inserted parts and each inserted part is provided with a slit that forms a press-contacting part and an auxiliary part, said antitheft retainer clip comprising:

press-contacting parts, each formed to be substantially the same in width as an upper part of a cylinder slit, provided in each of a pair of anti-rotation protrusions formed on side end parts of a flange part of a key cylinder;

raised parts, each formed on each of said press-contacting parts that are put in pressed contact against said cylinder slit upper parts; and inclining parts, each provided continuous to each of said raised parts;

wherein protrusion-like parts, which protrude towards an automotive body panel, are formed on said raised parts; and wherein a reinforcing plate is formed at the automotive body panel side of the inserted parts of the retainer clip.

7. An antitheft retainer clip, wherein a retainer clip with a substantially C-like planar shape has a pair of inserted parts and each inserted part is provided with a press-contacting part that is put in pressed contact against an upper part of a cylinder slit, provided at each of a pair of anti-rotation protrusions formed on side end parts of a flange part of a key cylinder, said antitheft retainer clip comprising:

press-contacting parts, formed to be substantially the same in width as said cylinder slit upper parts;

raised parts, each formed on each of said press-contacting parts that are put in pressed contact against said cylinder slit upper parts; and inclining parts, each provided continuous to each of said raised parts;

wherein auxiliary recessed parts, which are recessed with respect to an automotive body panel, are formed on said inserted parts.

8. The antitheft retainer clip as set forth in claim 7, wherein a reinforcing plate is formed at the automotive body panel side of the inserted parts of the retainer clip.

9. An antitheft retainer clip, wherein a retainer clip with a substantially C-like planar shape has a pair of inserted parts and each inserted part is provided with a press-contacting part that is put in pressed contact against an upper part of a cylinder slit, provided at each of a pair of anti-rotation protrusions formed on side end parts of a flange part of a key cylinder, said antitheft retainer clip comprising:

press-contacting parts, formed to be substantially the same in width as said cylinder slit upper parts;

raised parts, each formed on each of said press-contacting parts that are put in pressed contact against said cylinder slit upper parts; and inclining parts, each provided continuous to each of said raised parts;

wherein a reinforcing plate is formed at an automotive body panel side of the inserted parts of the retainer clip.

10. An antitheft retainer clip, wherein a retainer clip with a substantially C-like planar shape has a pair of inserted parts and each inserted part is provided with a press-contacting part that is put in pressed contact against an upper part of a cylinder slit, provided at each of a pair of anti-rotation protrusions formed on side end parts of a flange part of a key cylinder, said antitheft retainer clip comprising:

press-contacting parts, formed to be substantially the same in width as said cylinder slit upper parts;

raised parts, each formed on each of said press-contacting parts that are put in pressed contact against said cylinder slit upper parts;

inclining parts, each provided continuous to each of said raised parts;

wherein protrusion-like parts, which protrude towards an automotive body panel, are formed on said raised parts; and wherein auxiliary recessed parts, which are recessed with respect to the automotive body panel, are formed on said inserted parts.

11. The antitheft retainer clip as set forth in claim 10, wherein a reinforcing plate is formed at the automotive body panel side of the inserted parts of the retainer clip.

12. An antitheft retainer clip, wherein a retainer clip with a substantially C-like planar shape has a pair of inserted parts and each inserted part is provided with a press-contacting part that is put in pressed contact against an upper part of a cylinder slit, provided at each of a pair of anti-rotation protrusions formed on side end parts of a flange part of a key cylinder, said antitheft retainer clip comprising:

press-contacting parts, formed to be substantially the same in width as said cylinder slit upper parts;

raised parts, each formed on each of said press-contacting parts that are put in pressed contact against said cylinder slit upper parts; and inclining parts, each provided continuous to each of said raised parts;

wherein protrusion-like parts, which protrude towards an automotive body panel, are formed on said raised parts; and wherein a reinforcing plate is formed at the automotive body panel side of the inserted parts of the retainer clip.

13. A method of manufacturing an antitheft retainer clip, wherein a retainer clip with a substantially C-like planar shape has a pair of inserted parts and each inserted part is provided with a slit that forms a press-contacting part and an auxiliary part, said antitheft retainer clip manufacturing method comprising the steps of:

forming each of said press-contacting parts to be substantially the same in width as an upper part of a cylinder slit, provided in each of a pair of anti-rotation protrusions formed on side end parts of a flange part of a key cylinder;

forming a raised part on each of said press-contacting parts that are put in pressed contact against said cylinder slit upper parts;

forming an inclining part continuous to each of said raised parts; and forming auxiliary recessed parts, which are recessed with respect to an automotive body panel, on said auxiliary parts.

14. The antitheft retainer clip manufacturing method as set forth in claim 13, further comprising the step of:

forming a reinforcing plate on the automotive body panel side of the inserted parts of the retainer clip.

15. A method of manufacturing an antitheft retainer clip, wherein a retainer clip with a substantially C-like planar shape has a pair of inserted parts and each inserted part is provided with a slit that forms a press-contacting part and an auxiliary part, said antitheft retainer clip manufacturing method comprising the steps of:

forming each of said press-contacting parts to be substantially the same in width as an upper part of a cylinder slit, provided in each of a pair of anti-rotation protrusions formed on side end parts of a flange part of a key cylinder; forming a raised part on each of said press-contacting parts that are put in pressed contact against said cylinder slit upper parts;

forming an inclining part continuous to each of said raised parts; and forming a reinforcing plate on an automotive body panel side of the inserted parts of the retainer clip.

16. A method of manufacturing an antitheft retainer clip, wherein a retainer clip with a substantially C-like planar shape has a pair of inserted parts and each inserted part is provided with a slit that forms a press-contacting part and an auxiliary part, said antitheft retainer clip manufacturing method comprising the steps of:

forming each of said press-contacting parts to be substantially the same in width as an upper part of a cylinder slit, provided in each of a pair of anti-rotation protrusions formed on side end parts of a flange part of a key cylinder; forming a raised part on each of said press-contacting parts that are put in pressed contact against said cylinder slit upper parts;

forming an inclining part continuous to each of said raised parts;

forming protrusion-like parts, which protrude towards an automotive body panel, on said raised parts; and forming auxiliary recessed parts, which are recessed with respect to the automotive body panel, on said auxiliary parts.

17. The antitheft retainer clip manufacturing method as set forth in claim 16, further comprising the step of:

forming a reinforcing plate on the automotive body panel side of the inserted parts of the retainer clip.

18. A method of manufacturing an antitheft retainer clip, wherein a retainer clip with a substantially C-like planar shape has a pair of inserted parts and each inserted part is provided with a slit that forms a press-contacting part and an auxiliary part, said antitheft retainer clip manufacturing method comprising the steps of:

forming each of said press-contacting parts to be substantially the same in width as an upper part of a cylinder slit, provided in each of a pair of anti-rotation protrusions formed on side end parts of a flange part of a key cylinder; forming a raised part on each of said press-contacting parts that are put in pressed contact against said cylinder slit upper parts;

forming an inclining part continuous to each of said raised parts;

forming protrusion-like parts, which protrude towards an automotive body panel, on said raised parts; and forming a reinforcing plate on the automotive body panel side of the inserted parts of the retainer clip.

19. A method of manufacturing an antitheft retainer clip, wherein a retainer clip with a substantially C-like planar shape has a pair of inserted parts and each inserted part is provided with a press-contacting part that is put inpressed contact against an upper part of a cylinder slit, provided in each of a pair of anti-rotation protrusions formed on side end parts of a flange part of a key cylinder, said antitheft retainer clip manufacturing method comprising the steps of:

forming each said press-contacting parts to be substantially the same in width as each cylinder slit upper part;

forming a raised part on each of said press-contacting parts that are put in pressed contact against said cylinder slit upper parts;

forming an inclining part continuous to each of said raised parts; and forming auxiliary recessed parts, which are recessed with respect to an automotive body panel, on said inserted parts.

20. The antitheft retainer clip manufacturing method as set forth in claim 19, further comprising the step of:

forming a reinforcing plate on the automotive body panel side of the inserted parts of the retainer clip.

21. A method of manufacturing an antitheft retainer clip, wherein a retainer clip with a substantially C-like planar shape has a pair of inserted parts and each inserted part is provided with a press-contacting part that is put inserted contact against an upper part of a cylinder slit, provided in each of a pair of anti-rotation protrusions formed on side end parts of a flange part of a key cylinder, said antitheft retainer clip manufacturing method comprising the steps of:

forming each said press-contacting parts to be substantially the same in width as each cylinder slit upper part;

forming a raised part on each of said press-contacting parts that are put in pressed contact against said cylinder slit upper parts;

forming an inclining part continuous to each of said raised parts; and forming a reinforcing plate on an automotive body panel side of the inserted parts of the retainer clip.

22. A method of manufacturing an antitheft retainer clip, wherein a retainer clip with a substantially C-like planar shape has a pair of inserted parts and each inserted part is provided with a press-contacting part that is put inpressed contact against an upper part of a cylinder slit, provided in each of a pair of anti-rotation protrusions formed on side end parts of a flange part of a key cylinder, said antitheft retainer clip manufacturing method comprising the steps of:

forming each said press-contacting parts to be substantially the same in width as each cylinder slit upper part;

forming a raised part on each of said press-contacting parts that are put in pressed contact against said cylinder slit upper parts;

forming an inclining part continuous to each of said raised parts;

forming protrusion-like parts, which protrude towards an automotive body panel, on said raised parts; and forming auxiliary recessed parts, which are recessed with respect to the automotive body panel, on said inserted parts.

23. The antitheft retainer clip manufacturing method as set forth in claim 22, further comprising the step of:

forming a reinforcing plate on the automotive body panel side of the inserted parts of the retainer clip.

24. A method of manufacturing an antitheft retainer clip, wherein a retainer clip with a substantially C-like planar shape has a pair of inserted parts and each inserted part is provided with a press-contacting part that is put inpressed contact against an upper part of a cylinder slit, provided in each of a pair of anti-rotation protrusions formed on side end parts of a flange part of a key cylinder, said antitheft retainer clip manufacturing method comprising the steps of:

forming each said press-contacting parts to be substantially the same in width as each cylinder slit upper part;

forming a raised part on each of said press-contacting parts that are put in pressed contact against said cylinder slit upper parts;

forming an inclining part continuous to each of said raised parts;

forming protrusion-like parts, which protrude towards an automotive body panel, on said raised parts; and forming a reinforcing plate on the automotive body panel side of the inserted parts of the retainer clip.

* * * * *